UNITED STATES PATENT OFFICE.

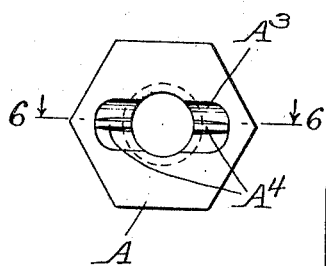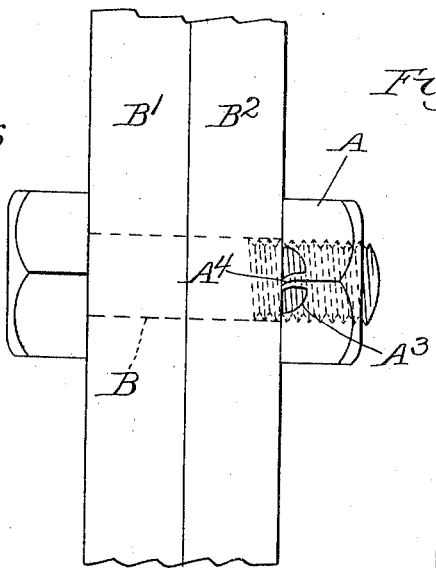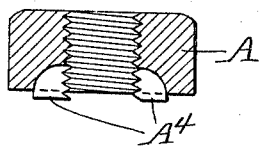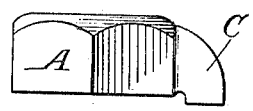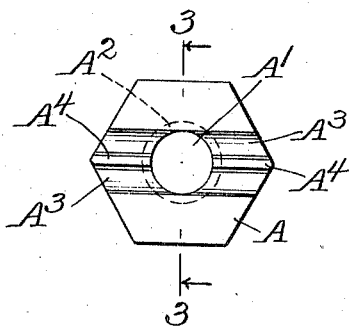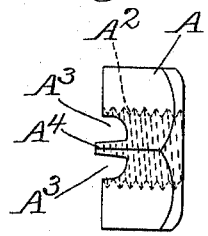

CHARLES W. DAKE, OF CHICAGO, ILLINOIS.

LOCK-NUT.

1,316,084.  Specification of Letters Patent.  Patented Sept. 16, 1919.

Application filed September 17, 1917. Serial No. 191,686.

*To all whom it may concern:*

Be it known that I, CHARLES W. DAKE, a citizen of the United States, residing at Chicago, in the county of Cook and State of Illinois, have invented a certain new and useful Improvement in Lock-Nuts, of which the following is a specification.

My invention relates to improvements in lock nuts and has for one object to provide a new and improved lock nut which shall be completely self-contained thus doing away with the necessity of any separate lock nut. Moreover, in my invention the lock part is integral with the holding nut so that there is only one piece used. Another object is to provide an integral one-piece lock nut which may be used a plurality of times and another object is to provide a lock nut which will give this locking effect when the reverse movement starts and which after the lock effect has been overcome will permit free and easy withdrawal of the nut.

By my invention I provide a nut with a wedging strip or tongue which engages a fixed surface adjacent the nut as the nut is seated is bent to one side by the rotation of the nut and remains yieldingly held by its own electricity against such surface so that it wedges against any return movement of the nut. There is sufficient elasticity, however, in the piece itself so that when a predetermined force is applied to the nut the nut will be released by the wedge strip turning over thus permitting a free withdrawal of the nut. When the nut is to be used again the wedge strip before the nut is seated come in contact with the fixed surface will be turned over back into the locking position and the nut will again be locked when it is seated.

My invention is illustrated more or less diagrammatically in the accompanying drawings, wherein—

Figure 1 is a side elevation of a plate showing my lock nut in use;

Fig. 2 is a bottom plan view of the nut;

Fig. 3 is a side elevation of the nut before it has been used;

Fig. 4 is a side elevation of a modified form.

Fig. 5 is a bottom plan view of a further modification.

Fig. 6 is a section along the line 6—6 of Fig. 5.

Like parts are indicated by like characters in all the figures.

A is the ordinary type of hexagonal cut apertured at $A^1$ and threaded at $A^2$. Extending across the working face of the nut is a slot $A^3$. This may be regarded as two radial slots. They happen to be parallel. They might be inclined one to another. Projecting outwardly from these slots are wedging tongues or lips $A^4$. These tongues or lips are screw-threaded in conformity to the rest of the nut but they might be cut away and the screw threads be omitted. These tongues are relatively long, high but narrow. They are integral with the nut and have a certain degree of elasticity.

B is an ordinary screw-threaded bolt. It is shown passing through plates $B^1$, $B^2$. The nut is shown screw-threaded upon it.

In Fig. 4 is shown a modified form wherein the slot is done away with and the lock is held by means of the tongue C which extends outwardly from the side of the nut and engages the fixed surface, in this case of the plate as indicated.

It will be evident that while I have shown in my drawings an operative device, still many changes might be made both in size, shape and arrangement of parts without departing materially from the spirit of my invention and I wish, therefore, that my drawings be regarded as in a sense diagrammatic.

In the specification and claims I have used the term "working face" to the nut as applied to the side of the nut which comes into engagement with that part of the surface which is engaged by the nut. I have shown the locking tongue engaging the plate or surface which is held by the bolt. Clearly, of course, the bolt might engage any other suitable surface and this would be done without departing in any way from the spirit of my invention.

The use and operation of my invention are as follows:—

The master nut is forged or may be milled with a plurality of radial tongues projecting outwardly above the face side of the nut from the bottom of an equal number of radial slots. These tongues are relatively thin and unsupported except at the bottom of the slots in which they lie. They may or may not be threaded but preferably they are threaded. When the nut is to be used it is screwed up on the bolt in the usual manner until the tongues strike the surface to be engaged by the face of the bolt. The tongues then are upset as indicated by the further movement of the nut and this movement continues until the face of the nut is in snug engagement with the surface and the tongue has been upset or bent to one side in the slot or groove. The nut operates thus in the usual manner to tighten the bolt.

When it is desired to release the nut the operator will rotate it in the opposite direction. This rotation will be resisted by the tongue which now acts as a wedge and that resistance will be very considerable, quite sufficient, in fact, to prevent any undesired and uncontrolled release of the nut. If, however, the operator applies sufficient pressure the tongue will be bent back in the opposite direction. This releases it and permits the operator to remove the nut in the usual manner.

The tongue is more or less flexible and can be bent from side to side a large number of times without destroying its usefulness and it is only necessary that the tongue be long enough so that it engages the surface against which the nut seats before the face of the nut engages it so that the tongue itself will in every case be bent back to act as a wedge.

The holding force of the locking means depends to a very large extent on the height of the tongue. If the tongue projects only a short distance down from the working face of the nut then only a slight pressure will be required to compress it and tip it over. If it extends a long distance a great deal of power will be required. It might be made so long that it would be almost impossible to release the nut but the danger then would be that it would be so long that it would tip clear over and give a smooth contact instead of a wedging contact. In other words, it might be made so long that the sharp edge of the tongue would no longer be forced into service but would be permitted to slide freely along it and this would be a satisfactory situation and satisfactory gripping of the locking mechanism.

In the modification shown in Figs. 5 and 6, the grooves do not extend clear out to the outside of the nut. Under some circumstances this might be quite sufficient and might result in a more durable nut and one wherein there would be less possibility of rusting of the nut and bolt. Moreover, it results in giving a slightly stronger nut.

I claim:—

1. The combination with a nut of outwardly projecting flexible locking strips adapted to engage the surface engaged by the nut and to wedge the nut and to lock it against rotation, said tongues adapted to lie within a channel cut across the working face of the nut, to extend above the working face of the nut and to be threaded at their inner ends in correspondence with the threads of the nut.

2. The combination with a nut of outwardly projecting radial flexible wedge strips adapted to engage the surface engaged by the nut to wedge the nut and lock it against rotation, the strips threaded at their inner ends in correspondence with the threads of the nut.

3. The combination with a nut of an integral flexible locking member projecting from the nut and adapted to come into wedge contact with a fixed surface, said member being attached to the nut at a point removed from its contact with such surface and arranged to be up-set rearwardly against said surface by a rotary movement of the nut.

4. The combination with a nut of an integral flexible locking member projecting from the nut and adapted to come into wedge contact with a fixed surface, said member being attached to the nut at a point removed from its contact with such surface and arranged to be up-set rearwardly against said surface by a rotary movement of the nut, said tongue having a sharp edge adapted to engage the fixed surface.

5. The combination with a nut of locking means therefor comprising a locking strip located in a plane containing the axis of rotation of the nut and extending radially from such axis, said strip being rigidly mounted on the nut at a point widely removed from its operating edge the operating or working edge extending down beyond the holding face of the nut to engage the surface upon which the nut is locked.

6. The combination with a nut of locking means therefor comprising a locking strip located in a plane containing the axis of rotation of the nut and extending radially from such axis, said strip being rigidly mounted on the nut at a point widely removed from its operating edge the operating or working edge extending down beyond the holding face of the nut to engage the surface upon which the nut is locked, the working surface of the nut being radially slotted to hold said strip, the strip projecting from the bottom of the slot and being out of contact with the nut.

In testimony whereof, I affix my signature in the presence of two witnesses this 14th day of September, 1917.

CHARLES W. DAKE.

Witnesses:
LAUREL M. DOREMUS,
CHRISTINA DEANS.